United States Patent [19]

Medicke et al.

[11] Patent Number: 5,317,757
[45] Date of Patent: May 31, 1994

[54] SYSTEM AND METHOD FOR FINITE STATE MACHINE PROCESSING USING ACTION VECTORS

[75] Inventors: John A. Medicke, Gaithersburg; Paul Posharow, Frederick, both of Md.

[73] Assignee: International Business Machines Corporation, Armonk, N.Y.

[21] Appl. No.: 834,188

[22] Filed: Feb. 6, 1992

[51] Int. Cl.$^5$ .................. G06F 9/30; G06F 15/16
[52] U.S. Cl. .................. 395/800; 364/238.3;
364/228.5; 364/254.8; 364/255.2; 364/255.7;
364/DIG. 1
[58] Field of Search ............ 395/800, 275, 700, 775,
395/650; 364/200, 900; 341/59

[56] References Cited

U.S. PATENT DOCUMENTS

| | | | |
|---|---|---|---|
| 4,413,251 | 11/1983 | Adler et al. | 340/347 |
| 4,507,752 | 3/1985 | McKenna et al. | 395/775 |
| 4,631,666 | 12/1986 | Harris et al. | 395/325 |
| 4,695,977 | 9/1987 | Hansen et al. | 364/900 |
| 4,724,521 | 2/1988 | Carron et al. | 364/200 |
| 4,727,575 | 2/1988 | Hansen et al. | 379/94 |
| 4,802,116 | 1/1989 | Ward et al. | 395/500 |
| 4,901,232 | 2/1990 | Harrington et al. | 395/275 |
| 4,905,181 | 2/1990 | Gregory | 395/275 |
| 4,965,721 | 10/1990 | Holtey et al. | 395/200 |
| 5,029,080 | 7/1991 | Otsuki | 395/200 |
| 5,105,353 | 4/1992 | Charles et al. | 395/700 |
| 5,201,048 | 4/1993 | Coulter et al. | 395/600 |

OTHER PUBLICATIONS

"Cascading Content-addressable memories" by Tim Moors et al. IEEE Micro, vol. 12, Issue 3, pp. 56–66, Jun. 1992.

"VLSI implementation of routing tables: Tries and Cams" by Tong-Bi Pei et al. IEEE Infocom '91, pp. 515–524 vol. 2, Mar. 1991.

"Term indexing for retrieval by unification", by Yokota H. et al. IEEE Computer Soc. Press, pp. 313–320, May 1989.

"Trie Hashing with Controlled Load", by Witold A. Litwin et al. IEEE Transactions on software engineering vol. 17, No. 7, Jul. 1991.

Primary Examiner—Lawrence E. Anderson
Assistant Examiner—Meng-Ai T. An
Attorney, Agent, or Firm—John E. Hoel

[57] ABSTRACT

A common set of building block action modules perform specific tasks in the finite state machine and are strongly modular in structure. The set of building block action modules can be made up of modules for tasks generic to resource type and modules that are resource type independent. A finite state machine is created for each resource type to govern the steps of activation and deactivation of the resource. Each finite state machine, uniquely defines the new state and action processing for each resource type. To tie the building block action modules to each finite state machine, action vectors are created for each resource type. The action vector correlates a particular action selection by the finite state machine to the dispatching of one or more building block action modules. An action vector can contain a plurality of elements. Each of these elements identifies an action module to which control is passed and a function request pointer. The function pointer identifies the specific function to be performed by the designated action module. The building block action modules are invoked in the order of occurrence of the elements in the action vector.

7 Claims, 17 Drawing Sheets

FIG. 5

Node Link Establishment
Finite State Machine

State Transition Matrix 42

|     | S0       | S1  | S2  | S3  | S4  | S5  |
|-----|----------|-----|-----|-----|-----|-----|
| I1  | S1 / v=1 | S0  | S0  | S0  | S0  | S0  |
| I2  |          | S2 / v=2 |     |     |     |     |
| I3  |          |     | S3 / v=2 |     |     |     |
| I4  |          |     |     | S4 / v=3 |     |     |
| I5  |          |     |     |     | S5 / v=4 |     |
| I6  |          |     |     |     |     | S6  |

FIG. 6

Node Failure Reporting
Finite State Machine

State Transition Matrix 44

|     | S0'      | S1'      | S2' | S3' | S4' | S5' |
|-----|----------|----------|-----|-----|-----|-----|
| I10 | S1' / v=8 |          |     |     |     |     |
| I11 |          | S0' / v=9 |     |     |     |     |

Input:

i = the value of the Link Event Index Input 45 from the communications manager 65

Variables Used:

f(i) = is the FSM identification number from the FSM selection table 50 s(f) = the current state from the ECB table 52

NEXTS(i,s) = the next state from the FSM matrix 42 v(i,s) = the action vector identification number from the FSM matrix 42

Output:

v = the value of the action vector ID v(i,s)

FIG. 9A

FSM Selection Table 50

| Input | FSM ID |
|---|---|
| i = 1 | f(1) = 1 |
| i = 2 | f(2) = 1 |
| i = 3 | f(3) = 1 |
| i = 4 | f(4) = 1 |
| i = 5 | f(5) = 1 |
| i = 6 | f(6) = 1 |
| ⋮ | ⋮ |
| i = 10 | f(10) = 2 |
| i = 11 | f(11) = 2 |
| ⋮ | ⋮ |

FIG. 9B

ECB Table 52

| FSM ID | STATE |
|---|---|
| f = 1 | s(1) = 0 |
| f = 2 | s(2) = 0 |
| f = 3 | s(3) = 0 |

FIG. 10

FSM Matrix 42

|  | S0<br>s = 1 | S1<br>s = 2 | S2<br>s = 3 | |
|---|---|---|---|---|
| i = 1 | NEXTS(1,1)<br>v.(1,1) | NEXTS(1,2)<br>v(1,2) | NEXTS(1,3)<br>v(1,3) | ← I1 |
| i = 2 |  | NEXTS(2,2)<br>v(2,2) |  | ← I2 |
| i = 3 |  |  | NEXTS(3,3)<br>v(3,3) | ← I3 |

FIG. 11

Action Vector Table 48

| | e=1 | e=2 | e=3 | e=4 | e=5 | |
|---|---|---|---|---|---|---|
| v=1 | AMOD=1<br>FTN=3 | AMOD=2<br>FTN=2 | AMOD=3<br>FTN=1 | AMOD=0 | | V1 |
| v=2 | AMOD=5<br>FTN=1 | AMOD=1<br>FTN=1 | AMOD=2<br>FTN=1 | AMOD=3<br>FTN=1 | AMOD=0 | V2 |
| v=3 | AMOD=4<br>FTN=2 | AMOD=1<br>FTN=1 | AMOD=2<br>FTN=1 | AMOD=3<br>FTN=1 | AMOD=0 | V3 |
| v=4 | AMOD=1<br>FTN=1 | AMOD=2<br>FTN=3 | AMOD=3<br>FTN=1 | AMOD=0 | | V4 |
| ⋮ | | | | | | |
| v=8 | AMOD=1<br>FTN=4 | AMOD=2<br>FTN=2 | AMOD=3<br>FTN=2 | AMOD=0 | | V8 |
| v=9 | AMOD=1<br>FTN=4 | AMOD=2<br>FTN=2 | AMOD=3<br>FTN=1 | AMOD=0 | | V9 |

FIG. 12

Action Vector Table 48

|  | e=1 | e=2 | e=3 | |
|---|---|---|---|---|
| v=1 | AMOD(1,1) <br> FTN(1,1) | AMOD(1,2) <br> FTN(1,2) | AMOD(1,3) <br> FTN(1,3) | V1 |
| v=2 | AMOD(2,1) <br> FTN(2,1) | AMOD(2,2) <br> FTN(2,2) | AMOD(2,3) <br> FTN(2,3) | V2 |

FIG. 14A  BUILDING BLOCK ACTION MODULES

| | |
|---|---|
| Module = 1: Form Header Portion | 54 |
| ON FTN(v,e) GOTO 1,2,3,4 | 100 |
| Function = 1 | 102 |
| Respond with message to requestor | |
|     Get Requestor's address | |
|     Put into Destination Field | |
|     Put "DATA" into Type Field | |
|     Return | |
| Function = 2 | 104 |
| Initiate sending message | |
|     Get destination address | |
|     Put into Destination Field | |
|     Put "DATA" into Type Field | |
|     Return | |
| Function = 3 | 106 |
| Respond with status to requestor | |
|     Get Requestor's address | |
|     Put into Destination Field | |
|     Put "STATUS" into Type Field | |
|     Return | |
| Function = 4 | 108 |
| Initiate sending status | |
|     Get destination address | |
|     Put into Destination Field | |
|     Put "STATUS" into Type Field | |
|     Return | |

FIG. 14B

```
Module = 2: Form Data Portion                   56
────────────────────────────────────
ON FTN(v,e) GOTO 1,2,3                          110
────────────────────────────────────
Function = 1                                    112

Get contents of message reg.

Put into Data Field

Return

Function = 2                                    114

Get contents of status reg.

Put into Data Field

Return

Function = 3                                    116

Put ACK into Data Field

Return
```

FIG. 14E

| Module 5: Identify Own Node Type | 62 |
|---|---|
| ON FTN(v,e) GOTO 1 | 140 |
| Function = 1<br><br>    If request APPN/LEN, then<br><br>        Load "APPN" into message reg.<br><br>    Else If request NN/EN, then<br><br>        Load "NN" into message reg.<br><br>    Return | 142 |

SYSTEM AND METHOD FOR FINITE STATE MACHINE PROCESSING USING ACTION VECTORS

BACKGROUND OF THE INVENTION

1. Technical Field

The invention disclosed broadly relates to data processing systems and more particularly relates to a system and method for finite state machine processing in a multi-resource, multi-process environment.

2. Background Art

Finite state machines (FSM) are commonly used in the implementation of telecommunications protocols and of input/output processors because finite state machines define all possible conditions completely and unambiguously. Unfortunately, a finite state machine designed for complete coverage, defines a set of "actions" which, when implemented, result in a code set which is extensive and complex.

Furthermore, it is quite common that a system which employs a finite state machine will be required to support multiple finite state machines. Such a system may be implementing different protocols or different node types implementing these protocols. Each of these node types requires a separate finite state machine.

The process carried out by a finite state machine will have many component processes or actions. The actions may have slight functional differences, depending on the type of process performed or they may vary by their sequence of execution. The desirability of modular design becomes difficult to achieve under these conditions.

One particular problem occurs when a system must support multiple and various types of resources. Each resource type will require service by its own finite state machine. In addition, there may be a demand for concurrent access to the finite state machine by other system processes. In addition, since new resource types may be added in the future, the implementation of new action processes will yield an unmanageable mass of code for its implementation.

In order to solve this problem, an action process structure must be developed that provides for modularity of design, concurrent access to finite state machines, and ease of maintenance.

A particular instance of this problem can occur as follows. An application may require that resource types have various types of link connections in an advanced peer-to-peer network (APPN). Advanced peer-to-peer networking is an extension to system network architecture (SNA) featuring greater distributed network control that avoids critical hierarchical dependencies, thereby isolating the effects of single-point failures. APPN also features dynamic exchange of network topology information to foster ease of connection and reconfiguration, adaptive route selection, and simplified network definition. APPN also features automated resource registration and directory look-up. APPN extends the logical unit 6.2 (LU 6.2) peer orientation for end user services to network control. APPN also uses LU 6.2 protocols in its control point sessions that provide the network control.

The particular problem application may have a large set of link connections, each one of the link types requiring its own finite state machine processing. The problem application may also have multiple processes that may need to perform finite state machine processing, concurrently. The problem application may also operate in an environment where one process will access the finite state machine processor, only to be interrupted by another higher priority process. Still further, the application problem may have different link connection types where there is a common collection of tasks that could be executed as actions resulting from finite state machine processing.

In a complex problem application such as this, the amount of code necessary to define the variety of finite state machines needed to carry out the application, becomes prohibitively large.

OBJECTS OF THE INVENTION

It is therefore an object of the invention to efficiently perform finite state machine processing in a system that is servicing multiple types of resources.

It is still another object of the invention to perform finite state machine processing in a system having multiple resources running under different concurrent processes.

It is still a further object of the invention to perform finite state machine processing in a system, implemented in a minimum code space.

It is still a further object of the invention to perform finite state machine processing in a system, that provides for ease of maintenance It is yet a further object of the invention to provide finite state processing in a system, so that the implementations are tailored for each resource.

It is yet a further object of the invention to perform finite state machine processing in a system, while maintaining modularity of the design.

SUMMARY OF THE INVENTION

These and other objects, features and advantages are accomplished by the invention disclosed herein. In accordance with the invention, a common et of building block action modules perform specific tasks in the finite state machine and are strongly modular in structure. The set of building block action modules can be made up of modules for tasks generic to resource type and modules that are resource type independent. A finite state machine is created for each resource type to govern the steps of activation and deactivation of the resource. Each finite state machine uniquely defines the new state and action processing for each resource type. To tie the building block action modules to each finite state machine, action vectors are created for each resource type. The action vector correlates a particular action selection by the finite state machine to the dispatching of one or more building block action modules. An action vector can contain a plurality of elements. Each of these elements identifies an action module to which control is passed and a function request pointer. The function pointer identifies the specific function to be performed by the designated action module. The building block action modules are invoked in the order of occurrence of the elements in the action vector.

BRIEF DESCRIPTION OF THE DRAWINGS

These and other objects, features and advantages of the invention will be more fully appreciated with reference to the accompanying figures.

FIG. 5 illustrates an example state transition matrix for node link establishment.

FIG. 6 illustrates another state transition matrix for node failure reporting.

FIG. 9A illustrates a finite state machine selection table.

FIG. 9B illustrates the environment control block table.

FIG. 10 illustrates the organization of a finite state machine matrix.

FIG. 11 shows an example of an action vector table.

FIG. 12 shows the organization of an action vector table.

FIGS. 14A, 14B, 14C, 14D and 14E show building block action modules.

DESCRIPTION OF THE BEST MODE FOR CARRYING OUT THE INVENTION

Figure 1:
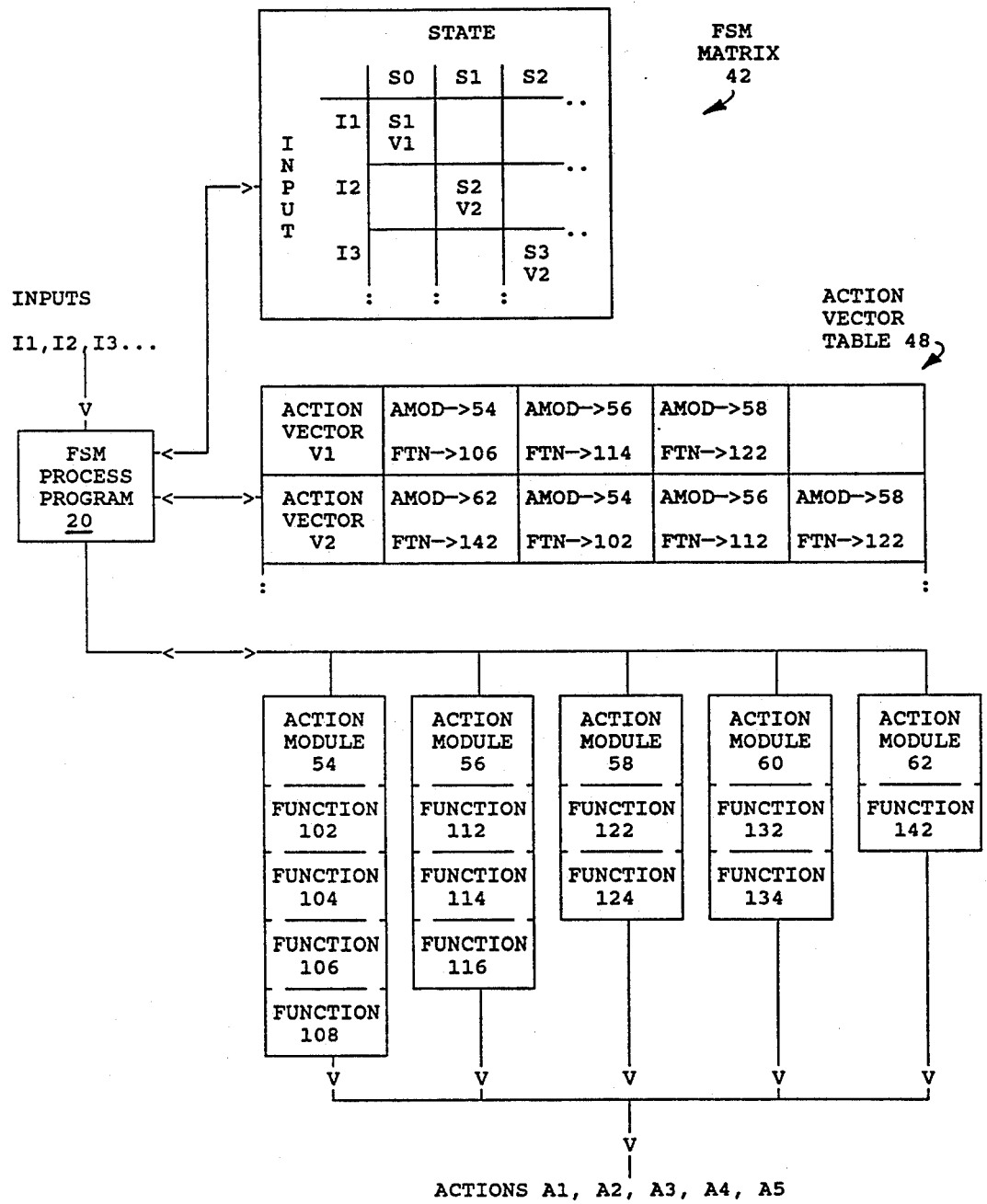
FIG. 1 is a conceptual block diagram showing the arrangement of the finite state machine process program, the finite state machine matrix, the action vector table, and the action modules.

The finite state machine processing invention disclosed herein can find application in many fields such as data communications system, I/O processes, data base products, or other products which require the handling of finite state machines for reacting to diverse types of inputs with responsive and tailored outputs. The particular application which is given as an example for the invention herein, is in the field of data communications. FIG. 1 shows an organizational diagram of the finite state machine processing invention. In FIG. 1, the finite state machine process program 20 receives inputs I1, I2, I3, etc. Such inputs will be for example integers which characterize link events which occur in a communications network. Also shown in FIG. 1 is the finite state machine matrix 42 which characterizes the various states and inputs which the finite state machine is designed to react to. Also shown in FIG. 1 is the action vector table 48 which contains several action vectors V1 and V2 which are pointed-to by the contents of the finite state machine matrix 42 and which, in turn invoke specified actions. Also shown in FIG. 1 are a plurality of action modules 54, 56, 58, 60 and 62. An action module such as action module 54, will contain one or more program functions such as functions 102, 104, 106 and 108 in the action module 54. Each of the functions in an action module when executed, will perform desired action which is a tailored response to a particular input I1, I2, I3. The particular action is governed by the current state S0, S1 or S2 which the finite state machine exists at the time of the receipt of the input. As can be seen in FIG. 1, action module 56 contains three functions 112, 114 and 116. The action module 58 contains two functions 122 and 124. The action module 60 contains two functions 132 and 134 and the action module 62 contains one function 142. The finite state machine (FSM) matrix 42, action vector table 48, and action modules 54, etc., will be described in greater detail in the following discussion.

Figure 2A:
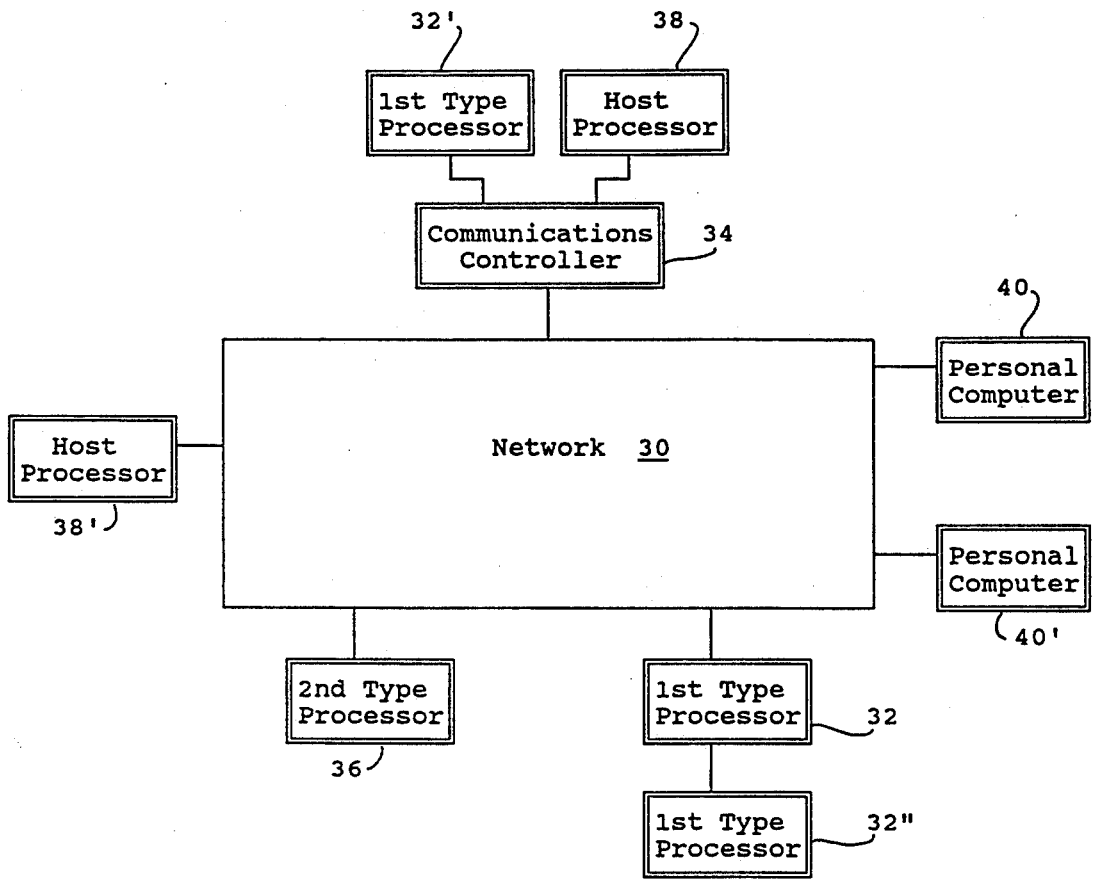
FIG. 2A is a system block diagram of an example communications network within which the invention can find application.

FIG. 2A illustrates an example data communications network 30 which has a plurality of network nodes (NN) such as the communications controller 34 and the first type processor 32, and it further has a plurality of end nodes (EN) such as the first type processor 32', the host processor 38, host processor 38', the second type processor 36, the first type processor 32", the personal computer 40 and the personal computer 40'. Each of these elements in the network 30 constitutes a communications node which will require the use of a finite state machine to carry out link establishment, and other communications functions.

Figure 2B:
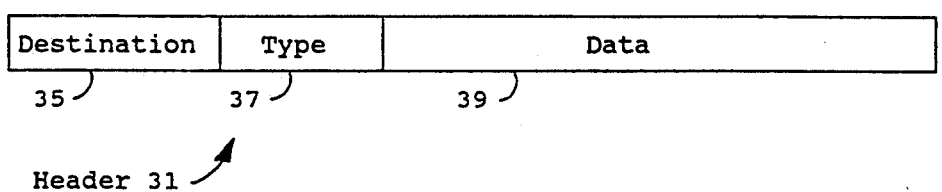
FIG. 2B illustrates the format of a message unit 33 which would be transmitted over the communications network shown in FIG. 2A.

FIG. 2B illustrates a message unit 33 which is the format for information which is transmitted from a first node to a second node in the network 30. The message unit 33 has a header portion 31 which includes the destination address 35 and the type information 37, indicating the type of information which is contained within the data portion 39 of the message unit 33. Computing systems controlled by a system architecture that ensures the orderly flow of information throughout the system are, for example, the System Network Architecture (SNA). The SNA architecture is described for example in an article entitled "Computer Network Architecture," by S. Wecker in *Computer*, Sep. 1979. Another overview, including a description of system network architecture (SNA) is given in an article entitled "An Introduction to Network Architectures and Protocols," by P. E. Green in the *IBM Systems Journal*, Vol. 18, No. 2, 1979. In these articles, the various computer networks, such as SNA, DNA, ARPANET, etc. are described by means of hierarchical architectural layers, where the lowest layer relates to the physical communication lines interconnecting various user nodes of the network and where the highest level concerns the conversation between various end users of the network. The SNA and other architectures include a message unit which is generalized by the message unit 33 of FIG. 2B.

Figure 3:
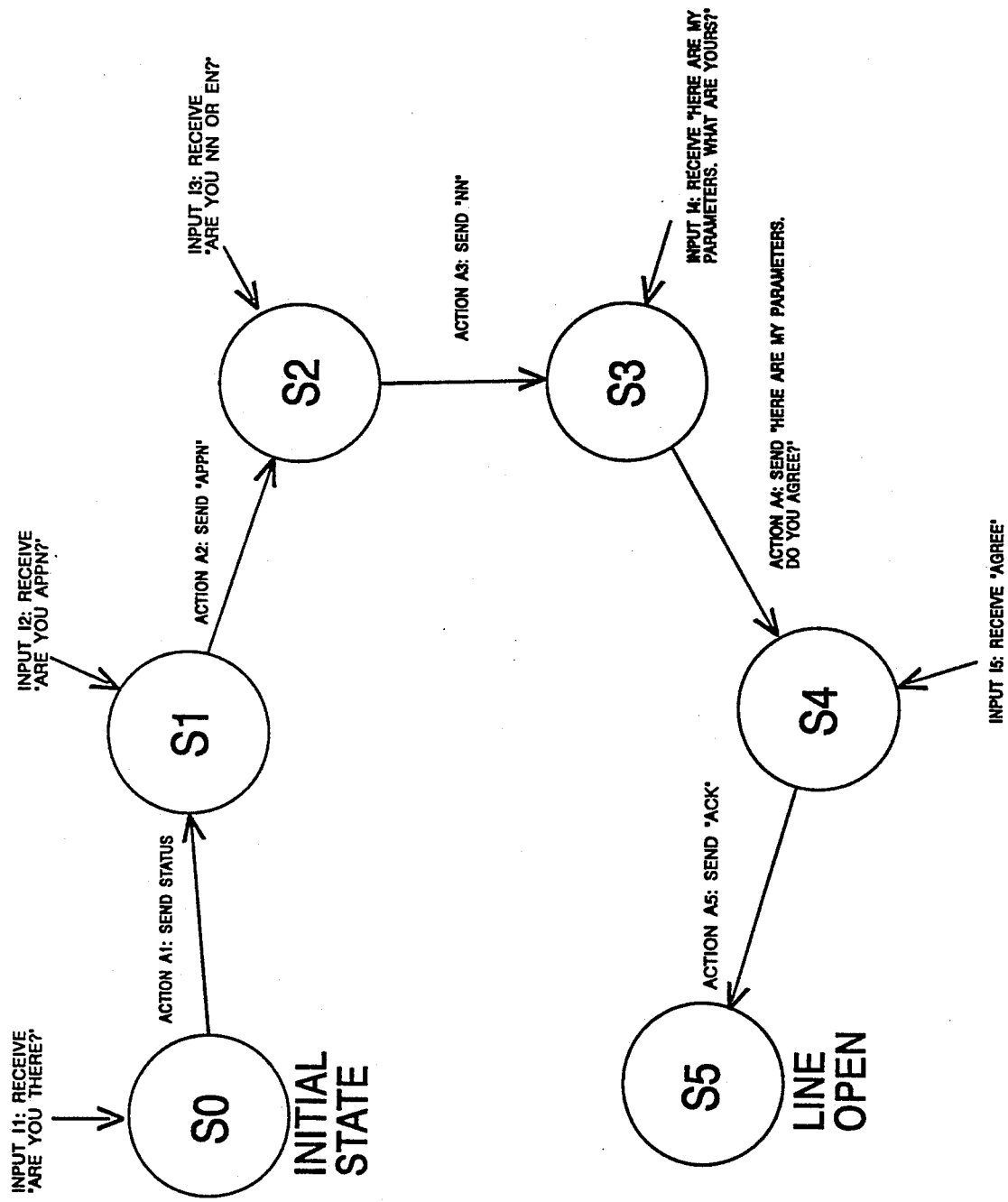
FIG. 3 is a state diagram illustrating an example finite state machine operation in a communications network.

FIG. 3 is a state diagram of an example finite state machine operation within the network 30, for establishing a link connection. For example, the communications controller 34 can be considered a network node (NN) which can receive a request from another communications node in the network, such as the first type processor 32, with a request to establish a communications link therebetween. The sequence necessary to establish the link is shown in the state diagram of FIG. 3. The state diagram representing a finite state machine operation, would be carried out in the communications controller 34. For example, if the communications controller 34 is in the initial state S0 and it receives an input I1 "Are you there?", the state diagram of FIG. 3 would have the action in response as the action Al, sending the status of the communications controller 34 back to the processor 32. The state of communications controller 34 then transitions to S1. Then in state S1, which is the new state for the communications controller 34 in the establishment of this link, an input I2 is received "Are you APPN?", which is a question posed by the processor 32 asking whether the communications controller 34 operates in the Application Peer-to-Peer network mode of operation. Communications controller 34 responds in its state S1 by sending a responsive action A2 with the message "APPN." The communications controller 34 then transitions to state S2. In state S2, the communications controller 34 now receives an input I3 from the processor 32 "Are you NN or EN?". In the state S2, the communications controller 34 responds to this input with the action A3, sending "NN." Thereafter, the communications controller 34 transitions to state S3. In state S3, the communications controller 34 receives an input I4 from the first processor 32, "Here are my parameters. What are yours?". The communications controller 34 being in state S3, responds with the action A4, sending the message "Here are my parameters. Do you agree?". The communications controller 34 then transitions to state S4. In state S4, the communications controller 34 receives a message from the processor 32 as the input I5, the message being "Agree." Being in state S4, the communications controller 34 responds with the action A5, sending an acknowledgement signal ACK to the processor 32. The communications controller 34 then transitions to state S5, thereby completing the establishment of the link and the line is now open between the communications controller 34 and the processor 32 for normal data communications exchanges.

Figure 4:
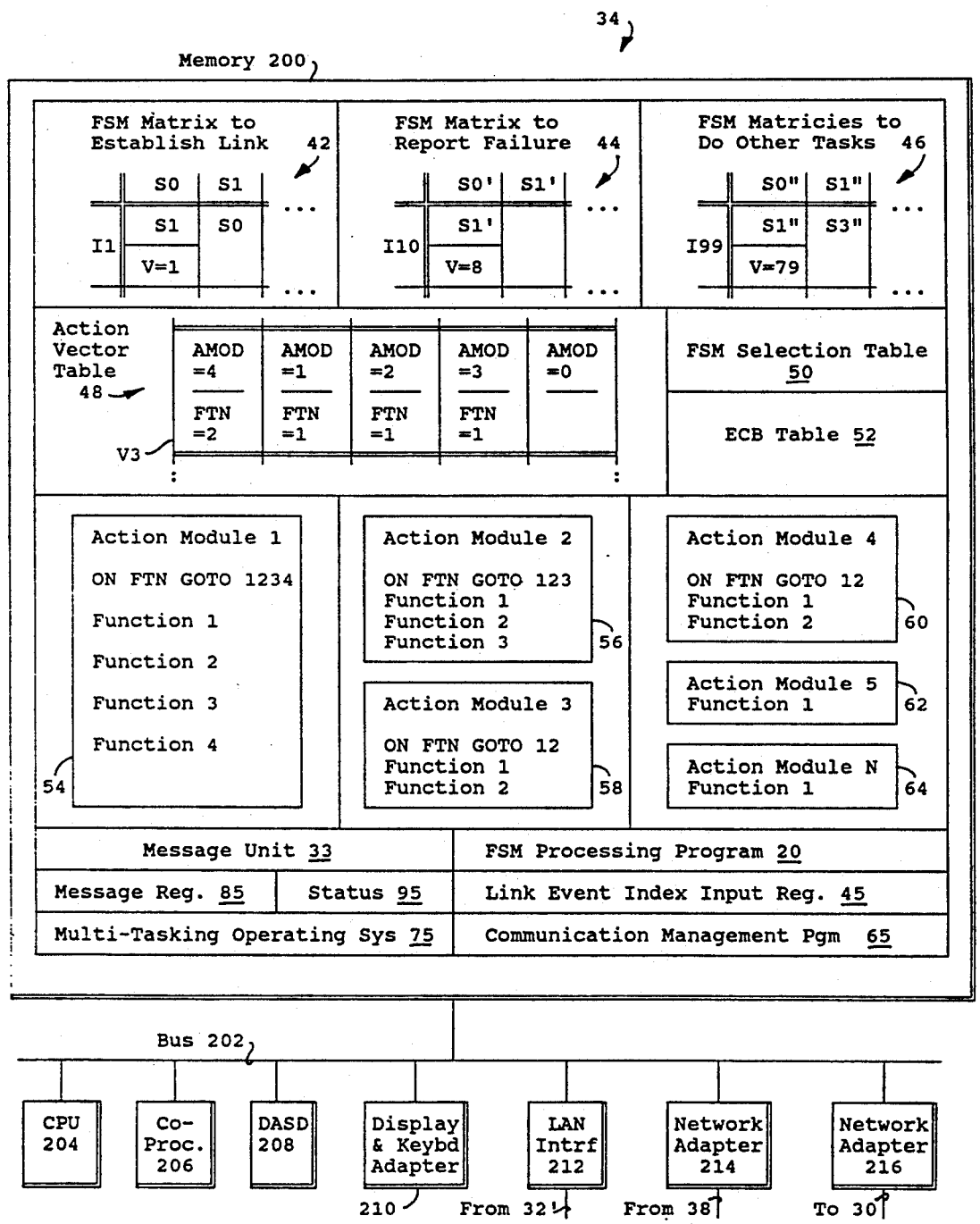
FIG. 4 is a detailed architectural diagram of a communications node within the network of FIG. 2A, which would make use of the finite state machine invention.

FIG. 4 is a detailed architectural diagram of a communications node such as the communications controller 34 in FIG. 2A. The organization of the communications node represented in FIG. 4 can be attributed to any of the network nodes or end nodes shown in FIG. 2A. The network node 34 shown in FIG. 4 includes the memory 200 which is connected by means of the bus 202 to the CPU 204, an optional co-processor 206, a moving storage medium device such as a disk drive 208, an optional display and keyboard adapter 210, a local area network interface 212, a first network adapter 214 and a second network adapter 216. The local area network interface 212 is connected to the first type processor 32' in FIG. 2A, the first network adapter 214 is connected to the host processor 38, and the network adapter 216 is connected over the network 30 to the first type processor 32, for example.

The memory 200 contains programs in the form of sequences of executable instructions which, when executed by the CPU 204, will carry out various resulting processes. As shown in the memory 200 of FIG. 4, the various program functional units are stored therein. The finite state machine (FSM) matrix 42 to establish a link is stored in memory 200, and is shown in greater detail in FIG. 5. The FSM matrix 44 to report a node failure is stored in memory 200, and is shown in greater detail in FIG. 6. Other FSM matrices 46 to perform other tasks can also be stored in the memory 200. The action vector table 48 is stored in the memory 200, and is shown in greater detail in FIG. 11. The FSM selection table 50 is stored in the memory 200, and is shown in greater detail in FIG. 9A. The environmental control block (ECB) table 52 is stored in the memory 200, and is shown in greater detail in FIG. 9B. The first action module 54 is stored in the memory 200, and is shown in greater detail in FIG. 14A. A second action module 56 in stored in memory 200 and is shown in greater detail in FIG. 14B. A third action module 58 is stored in memory 200, and is shown in greater detail in FIG. 14C. A fourth action module 60 is stored in memory 200 and is shown in greater detail in FIG. 14D. A fifth action module 62 is stored in memory 200 and is shown in greater detail in FIG. 14E. Other action modules 64 can also be stored in memory 200.

In addition, memory 200 also has a partition for the assembly of the message units 33, which is shown in greater detail in FIG. 2B. Also included in memory 200 is a message register 85 and a status register 95. Further included in memory 200 is a link event index input register 45 which receives integer values representing link events occurring on the network 30, and which are supplied from the communication manager program 65 which is also in memory 200. A multi-tasking operating system 75 is included in memory 200, to enable multi-tasking operations for the simultaneous processing of several finite state machines. The finite state machine (FSM) processing program 20 is also stored in FIG. 4, and is shown in greater detail in FIGS. 7, 8 and 13.

FIG. 5 shows a first example of a state transition matrix 42 for node link establishment. The state transition matrix 42 is arranged with several possible states for the node, S0, S1, S1, S3, S4 and S5 arrayed across the top of the matrix. Along the left-hand side of the matrix are the various input types I1, I2, I3, I4, I5 and I6. At the intersection of each respective state and input, there is corresponding stored information as to the next state which will occur and a designation of which vector in the action vector table 48 will be invoked. A reference to FIG. 10 will illustrate the organization of the next state data and the action vector identification data. In FIG. 10 it can be seen that the states S0, S1 and S2 are represented by the integer value of a variable s which equals one for S0, equals two for S1 and equals three for S2. Correspondingly, the inputs I1, I2 and I3 are represented by the integer values of a variable i equaling one, two or three, respectively. The designation of the next state which is to occur when a particular input is received for a given state, is represented by the variable NEXTS(i, s). For each respective intersection of a state for the variable s and an input having a value for the variable i, there is a corresponding value for the designation of the NEXTS(i, s). In other words, the variable NEXTS(i, s) is a dimensioned variable with two arguments i, s. In a similar manner, the designation of the action vector to be pointed to in the action vector table 48, is determined by the value of the dimensioned variable v(i, s) which represents an integer identification value of a corresponding one of the plurality of action vectors in the action vector table 48. Returning now to FIG. 5, it can be seen that if the node 34 is in state S0 and if the input I1 occurs, then the state transition matrix 42 points to the action vector v equals one in the action vector table 48 and also, the state of node 34 transitions from the current state S0 to the next state S1. Similarly, if the node 34 were already in the state S1, and the input I1 were received, the node 34 would revert back to the state S0. Since no action vector is designated for that transition, no action other than the state transition will occur. It can be seen by inspection that the states S0, S1, S2, S3, S4 and S5 have designated values for a next state and an action vector for various intersections with corresponding inputs I1, I2, I3, I4, I5 and I6.

A brief reference will be made here to FIG. 6 which shows an alternate state transition matrix 44 which implements a finite state machine for node failure reporting. Here, the states S0' through S5' and inputs I10 and I11 have corresponding next state and action vector designations for selected combinations of the states and inputs. The selection of which FSM state transition matrix is to be used, is performed by step 72 of the flow diagram of FIG. 8, where the input value "i" is used to access the FSM selection table 50 in FIG. 9A. The finite state machine processing management invention disclosed herein is able to handle two or more finite state machine operations, in a multi-tasking mode.

Figure 7:
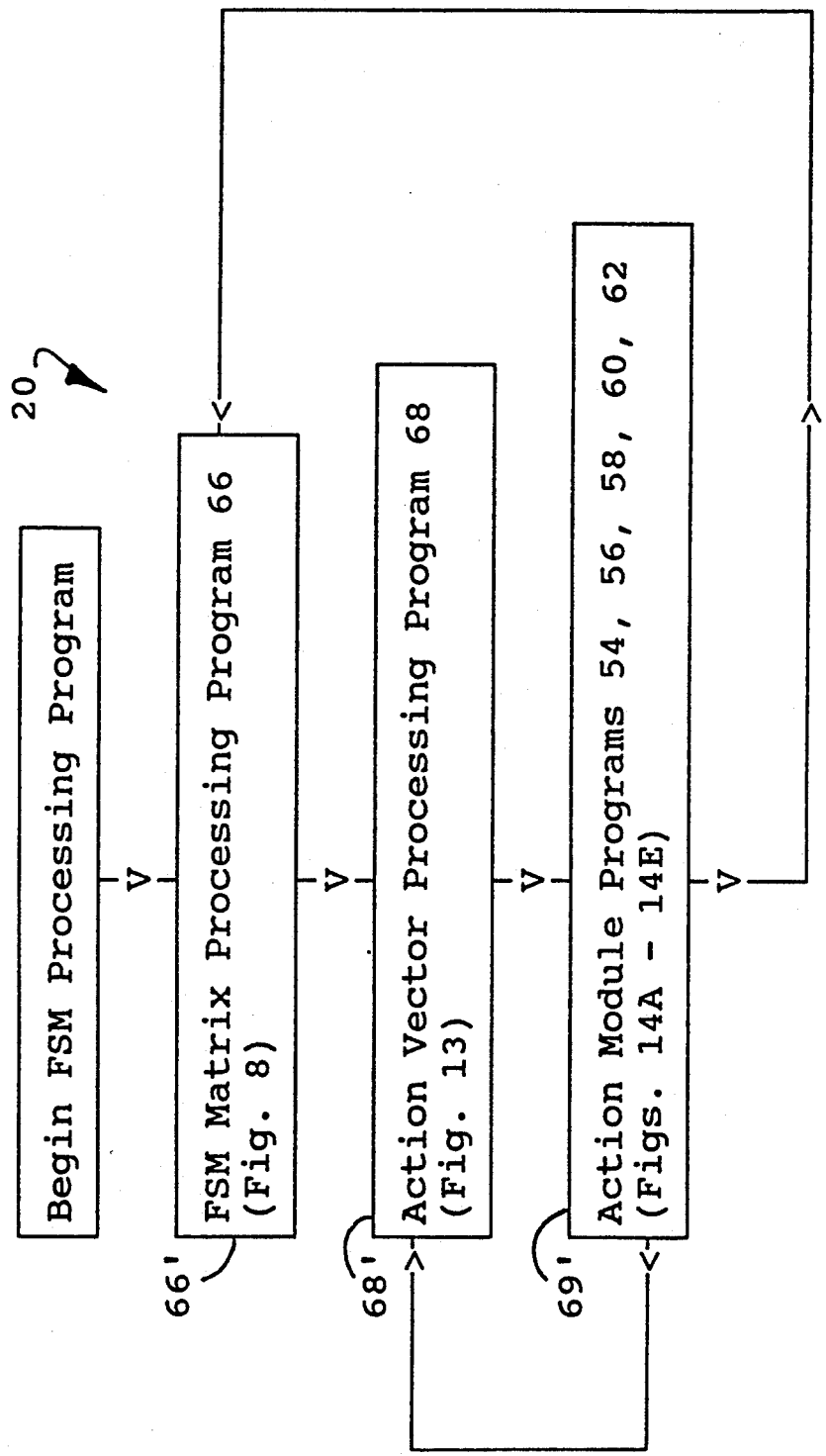
FIG. 7 is a flow diagram of the finite state machine processing program.

FIG. 7 is a flow diagram of the finite state machine processing program, in accordance with the invention. The program 20 is shown with three major steps, step 66' is the finite state machine matrix processing program 66 which is shown in greater detail in FIG. 8. After the execution of the program 66, the program 20 then transitions to step 68' which invokes the action vector processing program 68 shown in greater detail in FIG. 13. Step 68' then transitions to a designated one of the plurality of action module programs 54, 56, 58, 60 or 62 in step 69', as are shown in FIGS. 14A through 14E. There is an iteration between steps 68' and 69' in FIG. 7, until all of the elements of a particular action vector designated for processing, have been completed. After all of the elements of the action vector have been completed, then the process transitions back to step 66' and the finite state machine matrix processing program 66 will begin again.

Figure 8:
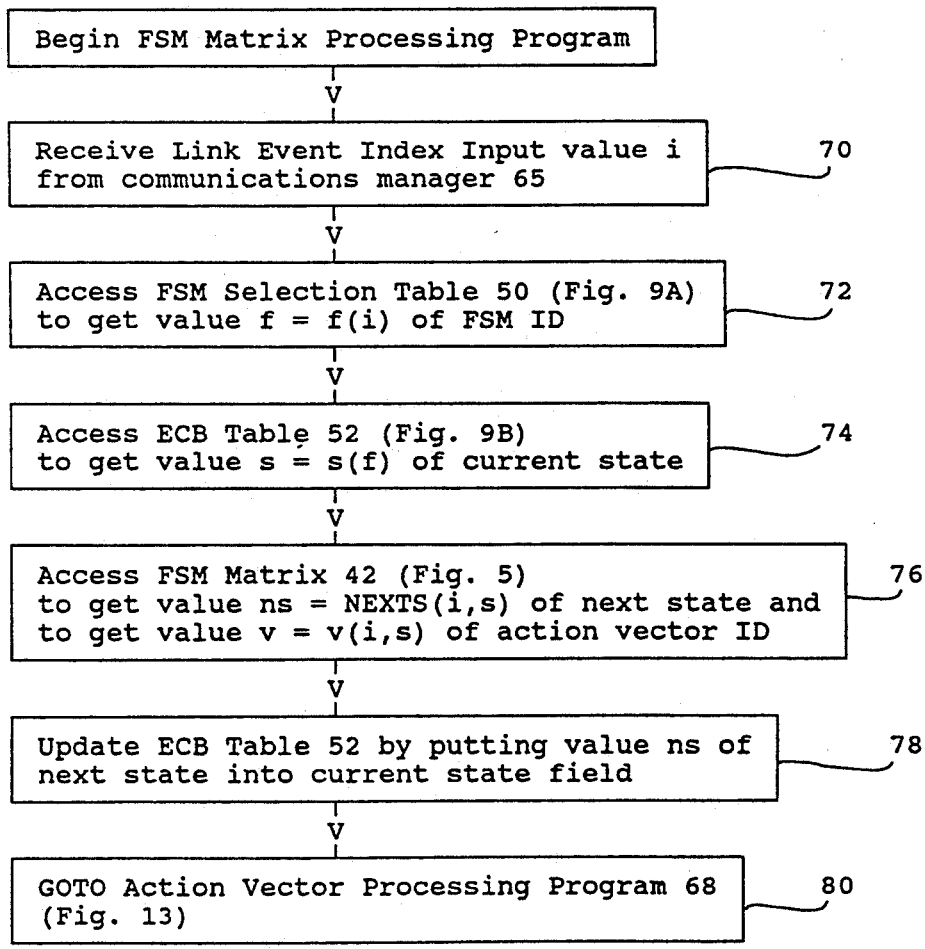
FIG. 8 is a flow diagram of the finite state machine matrix processing program.

Turning now to FIG. 8 for more detail of the FSM matrix processing program, it is seen that the input for the FSM matrix processing program is the value for the variable i which is the value of the link event index input 45 from the communications manager 65. This value corresponds to one of the inputs I1 through I5 of the state diagram of FIG. 3, for example. These integer values are provided by the communications manager 65 processing the particular link communications off the network 30 and summarizing each particular communication as an integer value, namely the link event index. The variables used in the FSM matrix processing program 66 of FIG. 8 include f(i) which is the finite state machine identification number which is accessed from the FSM selection table 50 of FIG. 9A. Another variable used in the FSM matrix processing program 66 is s(f) which is the current state of the node 34 as is accessed from the environment control block (ECB) table 52 of FIG. 9B. Still another variable used in program 66 is NEXTS(i, s) which is the next state which is accessed from the finite state machine matrix 42, based upon the values of i and s. Also, the variable v(i, s) is used in the program 66, which is the action vector identification number which is taken from the FSM matrix 42, based upon the values of i and s. The output of the program 66 is the value v of the action vector identification v(i, s).

In FIG. 8, the FSM matrix processing program 66 starts with step 70 which receives the link event index input value i from the communications manager 65. Then in step 72, access is made to the FSM selection table 50 in FIG. 9A, to get the value f=f(i) of the FSM identification. This step provides for the selection of one of a plurality of possible FSM matrices 42, 44, 46. Here, matrix 42 is selected. Then in step 74, access is made to the ECB table 52 in FIG. 9B, to get the value s of the variable s(f) of the current state for the node 34. Then in step 76, access is made to the FSM matrix 42 in FIG. 5, to get the value ns of the variable NEXTS(i, s) of the next state and also to get the value v of the variable v(i, s) of the action vector identification. Then in step 78, an update is made for the ECB table 52 by putting the value of ns of the next state into the current state field. Then in step 80, the process goes to the action vector processing program 68 in FIG. 13.

Reference can be made here to FIG. 9A which illustrates the finite state machine selection table 50. It can be seen that the various integer values for the input i=1 through i=11 are arrayed in a first column and the various corresponding values for the finite state machine identification f(i) are given. It is seen that for input values of i from one through six, the finite state machine identification is one, which corresponds to the finite state machine matrix 42 shown in FIG. 5. For values of i=10 and 11, the finite state machine identification is equal to two, which corresponds to the FSM matrix 44 shown in FIG. 6.

Brief mention can also be made of the environment control block (ECB) table 52 shown in FIG. 9B. The table in FIG. 9B has two columns, the FSM identification is arrayed in a first column and the corresponding current state of the node is represented in the second column. For example, for finite state machine $f=1$, which corresponds to the FSM matrix 42 of FIG. 5, the state $s(i)=0$ indicates that the finite state machine is in the state S0, as is shown in FIG. 5. Similar information can be derived for other finite state machines. For example finite state machine 44 corresponds to $f=2$ and a third finite state machine such as finite state machine 46 would correspond to $f=3$.

FIG. 11 illustrates an example action vector table 48 whose elements V1, V2, V3, V4, V8 and V9 are respectively pointed to by various locations in the finite state machine matrices 42 and 44, as can be seen in FIGS. 5 and 6. The structure of the action vector table 48 can be better appreciated with reference to FIG. 12, which shows that each intersection of an element e=1, 2, 3, 4, 5 and the corresponding vector variable v=1, 2, 3, 4, 8 or 9, has a corresponding pair of two-dimensioned array variables, namely AMOD(v, e) and FTN(v, e). AMOD(1, 1) corresponds to the first element in the action vector V1 and is a pointer to one of the several action modules 54, 56, 58, 60 or 62. The corresponding FTN(1, 1) is a pointer to a particular function, 102, 104, 106 or 108 within an action module 54, for example. Thus it is seen, that when an FSM matrix has an element s=1, i=1, a vector pointer v (1, 1), if v (1, 1) is accessed which points to a particular vector V1, V2, etc. Then the contents of each of the elements e1, e2, e3, etc. for that vector, are sequentially accessed and sequentially point to designated action modules.

As can be seen in FIG. 12, each action vector V1, V2, etc., which is designated by its corresponding value of the vector variable v=1, 2, etc., has a corresponding plurality of vector elements e equals 1, 2, 3, etc. The two-dimensional variable AMOD(v, e) represents the identity of a particular action module pointed to by an element e in a vector. The second two-dimensional variable FTN(v, e) points to a particular function contained in the action module which is to be executed. With reference to FIG. 11, it can be seen that the vector V1, whose vector value v=1, has four elements, e=1, e=2, e=3 and e=4. For the first element e=1, the vector V1 has AMOD equal to one and this points to the first action module 54 shown in FIG. 14A. Correspondingly, the first element e=1 of the vector V1 has the function FTN equal to three and that points to the third function 106 contained in the action module 54 of FIG. 14A. Other designations in the action vector table 48 are similar. The last element of a particular action vector is AMOD=0. For example element e=4 in the vector V1 is the last element of that vector and by convention its value of AMOD is equal to zero.

Figure 13:
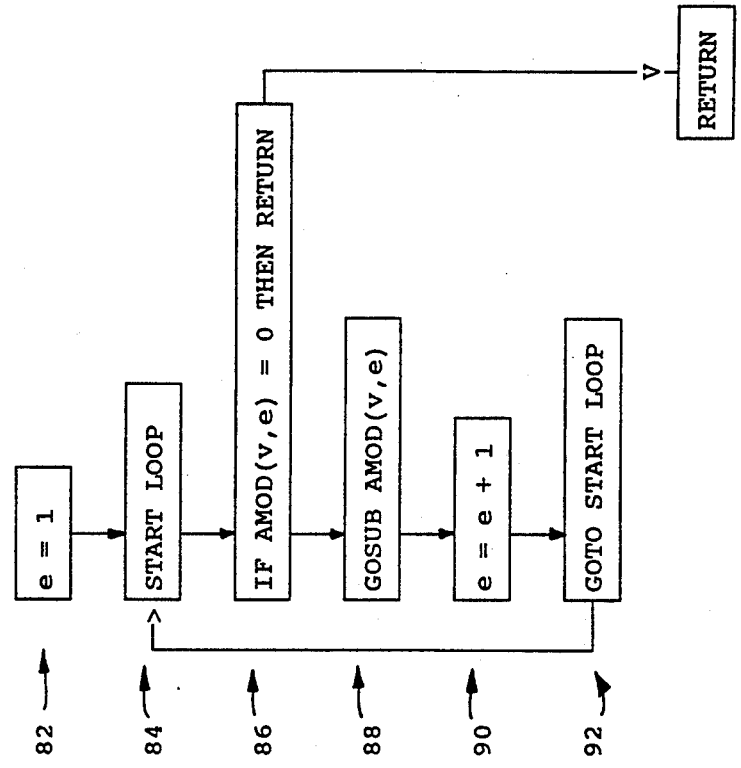
FIG. 13 shows a flow diagram of the action vector processing program.

FIG. 13 shows the action vector processing program 68. The inputs for the program 68 are the value of v which is the action vector number, and also the value of AMOD(v, e), which is the value of the action module number for each vector element "e" in the action vector whose number is v. The result of the action vector processing program 68 is to jump to each action module which corresponds to each vector element e. The program 68 starts with step 82 which sets the value of the element variable e=1. Then in step 84, a loop starts which transitions to step-86 wherein a test is determined to see if the value of AMOD(v, c) is equal to zero and if it is, then the program executes a return. If it is not, then the program transitions to step 88 which is a call to a subroutine represented by the action module whose number is the value of AMOD(v, e). It is at this point that one of the action modules 54, 56, 58, 60 or 62 designated by AMOD(v, e) is jumped to and its appropriate function executed. Then, the program transitions to step 90 which increments the value of e by unity and then the program transitions to step 92 which returns to the start of the loop at step 84. The loop continues until a value of AMOD(v, e) is processed with the value equal to zero, at which point the program executes a return.

FIGS. 14A through 14D show five example building block action modules. The first action module 54 shown in FIG. 14A forms the header portion for message unit 33 of FIG. 2B. Step 100 of the action module 54 is a computed goto which branches to either functions 102, 104, 106 or 108 depending upon the value of the function variable FTN(v, e). A computed goto is a computed jump instruction and is well-known in the art. For example, if the value of FTN(v, e) were equal to one, then the program represented by the action module 54 would jump to step 102 which would perform function number 1 responding with a message to the requester. Steps of getting the requester address, putting it into the destination field 35 of the message unit 33 and putting the designation "data" into the type field 37 of the message unit 33 would be performed, followed by a return operation. Alternately, if FTN(v, e) had a value of two, then the action module 54 would branch to step 104 which is the second function, initiating sending a message. The function begins by getting a destination address and then putting the destination address into the destination field 35 of the message unit 33, followed by putting the designation "data" into the type field 37 of the message unit 33, followed by a return operation. Alternately, if the action module 54 had the value of FTN(v, e) equal to three, then the program would branch to step 106 which is function 3. This would provide a response with status to the requester. First the process gets the requester's address, then puts the address into the destination field 35, then puts the "status" designation into the type field 37, followed by a return operation. Alternately, if the action module 54 operated on a value of FTN(v, e) equal to four, then the program would branch to step 108, which would initiate sending status. The program would begin by getting the destination address, then it would put the destination address into the destination field 35, followed by putting the destination "status" into the type field 37 of the message unit 33. This would then be followed by the return operation.

In a similar manner, the action module 56 of FIG. 14B, forms the data portion 39 of the message unit 33. If the corresponding value of FTN(v, e) in the computed goto operation 110 is one, then the program branches to step 112, wherein the process gets the contents of the message register 85 and puts it into the data field 39 of the message unit 33, followed by a return operation. Alternately, if the value FTN(v, e) is equal to two, then the computed goto step 110 branches to step 114, wherein the process gets the contents of the status register 95 and puts it into the data field 39 of the message unit 33, followed by a return operation. Alternately, if the value of FTN(v, e) is equal to three, then the computed goto step 110 branches to step 116 wherein an acknowledgement "ACK" indication is put into the data field 39 of the message unit 33, followed by a return operation.

Figure 14C:
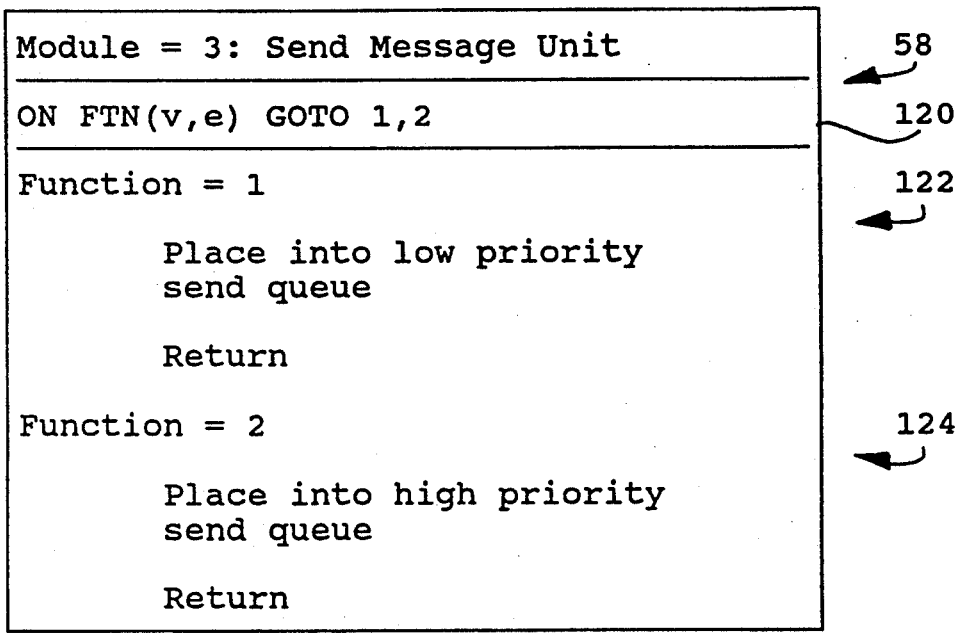

The action module 58 for sending the message unit 33, is shown in FIG. 14C and contains a computed goto function 120. If the value of FTN(v, e) in step 120 is equal to one, then the program branches to step 122 which places the message unit 33 into a low priority send queue, followed by a return operation. Alternately, if the value of FTN(v, e) in step 120 is equal to two, then the program branches to step 124 which places the message unit 33 into a high priority send queue, followed by a return operation.

Figure 14D:
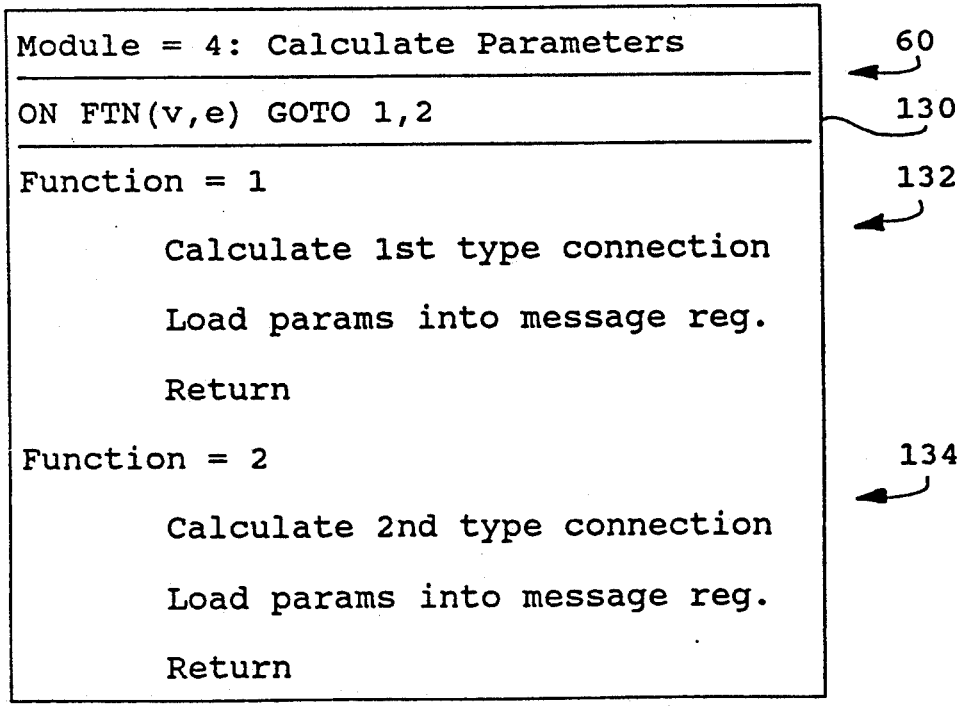

FIG. 14D illustrates the action module 60 which calculates parameters. If the value of FTN(v, e) in the computed goto step 130 is equal to one, then the program branches to step 132 which calculates a first type connection and loads the parameters into the message register 85, followed by a return operation. Alternately, if the value FTN(v, e) in step 130 is equal to two, then the program branches to step 134 wherein a calculation is performed for a second type connection and the parameters are loaded into the message register 85, followed by a return operation. FIG. 14E shows the action module 62 which identifies the OWN node type. Since a single function is provided as function 142 in the action module 62, the computed goto step 140 will branch to the single function at step 142 which performs a two stage test on the incoming message. If the request is APPN or LAN, then the program loads the response "APPN" into message register 85. Alternately, if the incoming request is NN/EN, then the program loads "NN" into the message register 85. Then the program performs a return operation.

Figure 15:
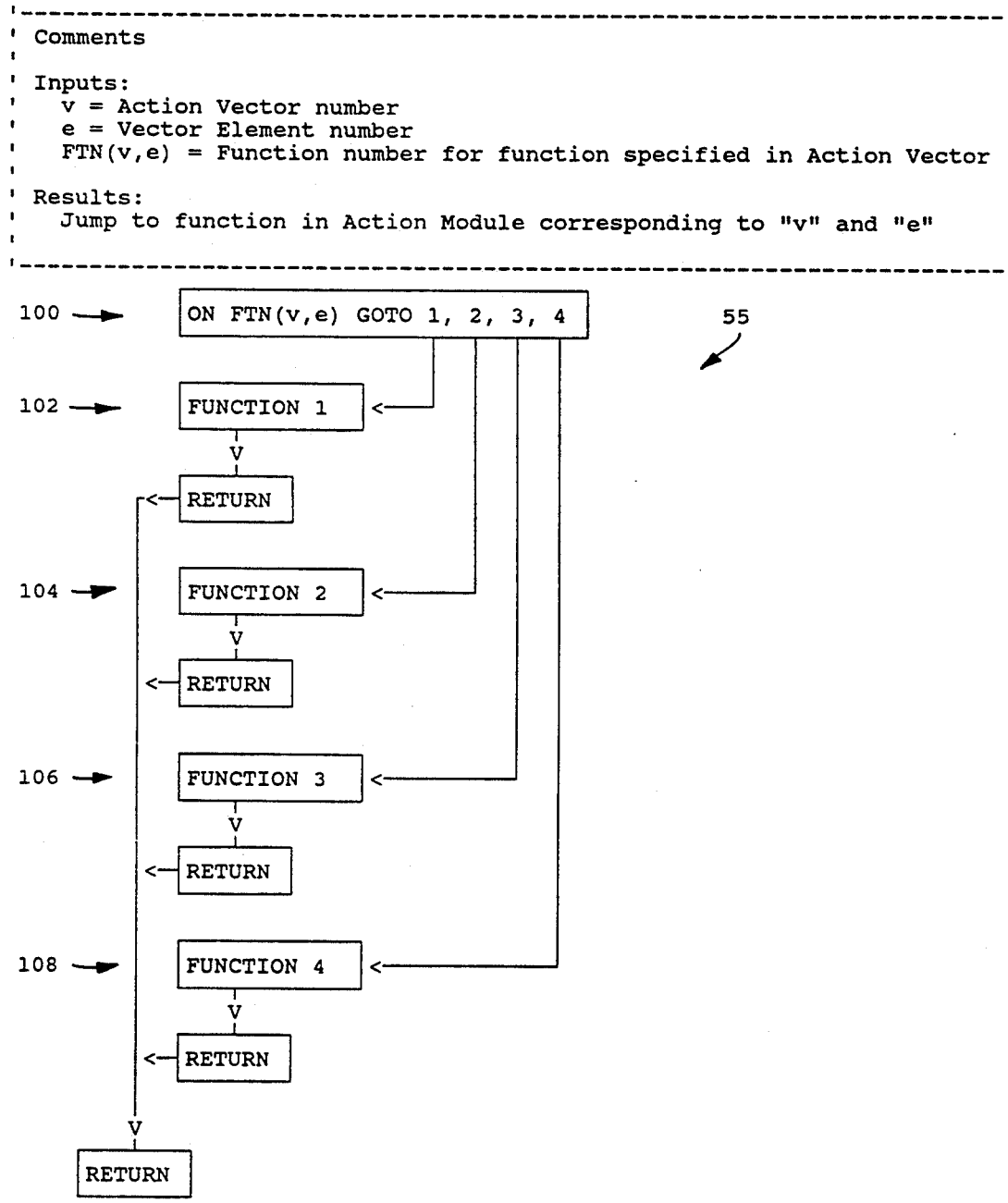
FIG. 15 is a flow diagram of a generic action module component function selection program.

Reference to FIG. 15 will illustrate a generic action module component selection program 55 after which the action module 54, for example, is modeled. The inputs for program 55 are the value v of the action vector number and the value e of the vector element number. Also input is the value FTN(v, e) which is the function number for the function specified in the action vector. The result of the program 55 is to jump to the function in the action module corresponding to the value of v and e. The program 55 starts with the computed goto step 100 which evaluates the value of FTN(v, e) and then performs a jump to either functions 102, 104, 106 or 108 depending upon whether the value of FTN(v, e) is equal to one, two, three or four, respectively. If the branch is to step 102, then function 1 is performed, followed by a return operation. If the branch is to step 104, then function 2 is performed, followed by a return operation. If step 106 is branched to, then function 3 is performed, followed by a return operation. If step 108 is branched to, then function 4 is performed, followed by a return operation.

It is seen by the above description, that the invention can efficiently perform finite state machine processing in a system that is servicing multiple types of resources running under different concurrent processes. The invention minimizes code space, provides ease of maintenance, and provides a tailored implementation for each resource while maintaining the modularity of the design. The invention has been described with reference to data communications finite state machine operations. However, the invention is also applicable to any application requiring a finite state machine, such as I/O processes or devices drivers, a data product that manages different types of records and which must maintain a state machine for each record type, or any product that requires the solution of problem with a finite state machine, which supports various types of resources, and which has concurrent processes.

Although a specific embodiment of the invention has been disclosed, it will be understood by those having skill in the art that changes can be made to that specific embodiment without departing from the spirit and the scope of the invention.

What is claimed is:

1. A data processing method for managing a finite state machine, in a data processing system having a memory for storing program instructions, an input means for receiving inputs, a processing unit for executing program instructions in response to said inputs, and an output means for producing an output in response to said processing unit executing said program instructions, comprising the steps of:

storing a first finite state machine transition matrix in said memory, having a plurality of next state indicators and vector pointers that can be accessed by a current state value in said memory and an input value;

storing a vector table of action vectors in said memory, said vector pointers identifying action vectors in said vector table, each of said action vectors including a sequence of vector elements having module pointers and function pointers;

storing a plurality of action modules in said memory, each action module including program instructions organized into a plurality of function segments, each of said module pointers identifying one of said plurality of action modules and said function pointers identifying one of said plurality of function segments;

receiving an input value from said input means and accessing said first finite state machine transition matrix with said input value and said current state value, for obtaining a first next state indicator and a first vector pointer;

accessing a first action vector from said vector table using said first vector pointer, for obtaining a first module pointer and a first function pointer from a first vector element in a first sequence; and executing program instructions in a first function segment pointed to by said first function pointer, in a first action module pointed to by said first module pointer, for producing a first output action by said output means.

2. The data processing method of claim 1, which further comprises the steps of:

accessing a second module pointer and a second function pointer from a second vector element in said first sequence, following said first vector element; and executing program instructions in a second function segment pointed to by said second function pointer, in a second action module pointed to by said second module pointer, for producing a second output action by said output means.

3. The data processing method of claim 1, which further comprises the steps of:

storing a second finite state machine transition matrix in said memory, having a plurality of next state indicators and vector pointers that can be accessed by a second current state value in said memory and an input value;

receiving a second input value from said input means and accessing said second finite state machine transition matrix with said second input value and said second current state value, for obtaining a second next state indicator and a second vector pointer;

accessing a second action vector from said vector table using said second vector pointer, for obtaining a second module pointer and a second function pointer from a first vector element in a second sequence; and executing program instructions in a second function segment pointed to by said second function pointer, in a second action module pointed to by said second module pointer, for producing a second output action by said output means.

4. A date processing method for managing a finite state machine in a data processor, comprising the steps of:

receiving an input value and accessing a first finite state machine transition matrix in said data processor using said input value and a current state value in said data processor, for obtaining a first next state indicator and a first vector pointer;

accessing a first action vector from a vector table in said data processor using said first vector pointer, for obtaining a first module pointer and a first function pointer from a first vector element in a first sequence of vector elements in said first action vector;

executing program instructions in a first function segment pointed to by said first function pointer said first segment being, in a first action module in said data processor, pointed to by said first module pointer, for producing a first output action;

accessing a second module pointer and a second function pointer from a second vector element in said first sequence, following said first vector element;

executing program instructions in a second function segment pointed to by said second function pointer, said second segment being in a second action module pointed to by said second module pointer, for producing a second output action;

receiving a second input value and accessing a second finite state machine transition matrix in said data processor using said second input value and a second current state value in said data processor, for obtaining a second next state indicator and a second vector pointer;

accessing a second action vector from said vector table using said second vector pointer, for obtaining a third module pointer and a third function pointer from a vector element in a sequence of vector elements in said second action vector; and executing program instructions in a third function segment pointed to by said third function pointer, said third segment being in a third action module in said data processor, pointed to by said third module pointer, for producing a third output action.

5. A data processing method for managing a finite state machine, in a data processing system having a memory for storing program instructions, an input means for receiving inputs, a processing unit for executing program instructions in response to said inputs, and an output means for producing an output in response to said processing unit executing said program instructions, comprising the steps of:

storing a finite state machine transition matrix in said memory, having a plurality of next state indicators and vector pointers that can be accessed by a current state value in said memory and an input value;

storing a vector table of action vectors in said memory, said vector pointers identifying action vectors in said vector table, each of said action vectors including a sequence of vector elements having module pointers and function pointers;

storing a plurality of action modules in said memory, each action module including program instructions organized into a plurality of function segments, each of said module pointers identifying one of said plurality of action modules and said function pointers identifying one of said plurality of function segments;

receiving an input value from said input means and accessing said finite state machine transition matrix with said input value and said current state value, for obtaining a first next state indicator and a first vector pointer;

accessing a first action vector from said vector table using said first vector pointer, for obtaining a first module pointer and a first function pointer;

executing program instructions in a first function segment pointed to by said first function pointer, in a first action module pointed to by said first module pointer, for producing a first output action by said output means;

receiving a second input value from said input means and accessing said finite sate machine transition matrix with said second input value and said first next state indicator, for obtaining a second next state indicator and a second vector pointer; and accessing a second action vector from said vector table using said second vector pointer, for obtaining a second module pointer and a second function pointer; and executing program instructions in a second function segment pointed to by said second function pointer, in a second action module pointed to by said second module pointer, for producing a second output action by said output means.

6. A data processing system for managing a finite state machine, comprising:

a memory for storing program instructions;
an input means for receiving inputs;
a processing unit coupled to said memory and to said input means, for executing program instructions in response to said inputs;
an output means coupled to said processing unit, for producing an output in response to said processing unit executing said program instructions;
said memory storing a finite state machine transition matrix in said memory, having a plurality of next state indicators and vector pointers that can be accessed by a current state value in said memory and an input value;

said memory storing a vector table of action vectors, said vector pointers identifying action vectors in said vector table, each of said action vectors including a sequence of vector elements having module pointers and function pointers;

said memory storing a plurality of action modules, each action module including program instructions organized into a plurality of function segments, each of said module pointers identifying one of said plurality of action modules and said function pointers identifying one of said plurality of function segments;

said input means receiving an input value from said input means and passing said input value to said processing unit;

said processing unit accessing said finite state machine transition matrix with said input value and said current state value, for obtaining a first next state indicator and a first vector pointer;

said processing unit accessing a first action vector from said vector table using said first vector pointer, for obtaining a first module pointer and a first function pointer; and said processing unit executing program instructions in a first function segment pointed to by said first function pointer, in a first action module pointed to by said first module pointer, for producing a first output action by said output means.

7. A data processing program for managing a finite state machine, in a data processing system having a memory for storing program instructions, an input means for receiving inputs, a processing unit for executing program instructions in response to said inputs, and an output means for producing an output in response to said processing unit executing said program instructions, said program, when executed in said processing unit, performing a method comprising the steps of:

receiving an input value from said input means and accessing a first finite state machine transition matrix with said input value and a current state value, for obtaining a first next state indicator and a first vector pointer;

accessing a first action vector from a vector table using said first vector pointer, for obtaining a first module pointer and a first function pointer from a first vector element in a first sequence therein; and executing program instructions in a first function segment pointed to by said first function pointer, in a first action module pointed to by said first module pointer, for producing a first output action by said output means;

accessing a second module pointer and a second function pointer from a second vector element in said first sequence, following said first vector element;

executing program instructions in a second function segment pointed to by said second function pointer, in a second action module pointed to by said second module pointer, for producing a second output action by said output means;

receiving a second input value from said input means and accessing a second finite state machine transition matrix with said second input value and a second current state value, for obtaining a second next state indicator and a second vector pointer;

accessing a second action vector from said vector table using said second vector pointer, for obtaining a third module pointer and a third function pointer from a first vector element in a second sequence therein; and executing program instructions in a third function segment pointed to by said third function pointer, in a third action module pointed to by said third module pointer, for producing a third output action by said output means.

* * * * *